US012578817B2

(12) United States Patent
Shuai et al.

(10) Patent No.: US 12,578,817 B2
(45) Date of Patent: Mar. 17, 2026

(54) DISPLAY PANEL, DRIVING METHOD THEREOF, AND ELECTRONIC TERMINAL

(71) Applicant: WUHAN CHINA STAR OPTOELECTRONICS TECHNOLOGY CO., LTD., Hubei (CN)

(72) Inventors: Chuan Shuai, Wuhan (CN); Xingru Chen, Wuhan (CN); Rui He, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 19/172,303

(22) Filed: Apr. 7, 2025

(65) Prior Publication Data
US 2025/0231638 A1 Jul. 17, 2025

Related U.S. Application Data

(63) Continuation-in-part of application No. 18/560,150, filed as application No. PCT/CN2023/104298 on Jun. 29, 2023, now abandoned.

(30) Foreign Application Priority Data

May 31, 2023 (CN) .......................... 202310644115.3

(51) Int. Cl.
G06F 3/041 (2006.01)
G06F 3/044 (2006.01)
G06F 3/046 (2006.01)

(52) U.S. Cl.
CPC ........ G06F 3/04166 (2019.05); G06F 3/0442 (2019.05); G06F 3/046 (2013.01); *G06F 3/0443* (2019.05); *G06F 2203/04106* (2013.01)

(58) Field of Classification Search
CPC .......................... G06F 3/0412; G06F 3/04184
See application file for complete search history.

(56) References Cited

U.S. PATENT DOCUMENTS

| | | | |
|---|---|---|---|
| 2018/0004343 A1* | 1/2018 | Shin | G06F 3/0412 |
| 2018/0024654 A1* | 1/2018 | Koike | G06F 3/0441 |
| | | | 345/174 |

(Continued)

FOREIGN PATENT DOCUMENTS

| | | |
|---|---|---|
| CN | 106598334 A | 4/2017 |
| CN | 107977112 A | 5/2018 |

(Continued)

OTHER PUBLICATIONS

International Search Report in International application No. PCT/CN2023/104298, mailed on Dec. 11, 2023, with English translation.

(Continued)

*Primary Examiner* — Ryan A Lubit
(74) *Attorney, Agent, or Firm* — HSML P.C.

(57) ABSTRACT

The present disclosure provides a display panel and a driving method thereof, and an electronic terminal. The display panel includes a drive circuit. The drive circuit includes a timing circuit configured to provide a frame synchronization signal having a frame period (including a plurality of sub-periods). Each sub-period includes a sub-charging time period and a sub-blanking time period. In a first type of frame period, a gate drive circuit and an electromagnetic touch drive circuit in the drive circuit are respectively configured to provide a display pulse during the sub-charging time period and provide an electromagnetic touch scanning signal during the sub-blanking time period.

20 Claims, 7 Drawing Sheets

(56)                   References Cited

U.S. PATENT DOCUMENTS

| | | | | |
|---|---|---|---|---|
| 2018/0046290 | A1* | 2/2018 | Song | G06F 3/0412 |
| 2018/0113559 | A1* | 4/2018 | Bae | G06F 3/03545 |
| 2019/0146619 | A1* | 5/2019 | Kurasawa | G02F 1/13338 |
| | | | | 345/173 |
| 2019/0384478 | A1* | 12/2019 | Teranishi | G06F 3/04166 |
| 2021/0149540 | A1* | 5/2021 | Shikata | G06F 3/04184 |
| 2022/0019307 | A1* | 1/2022 | Morioka | G06F 3/0443 |
| 2022/0093031 | A1* | 3/2022 | Cho | G06F 3/041662 |
| 2022/0155937 | A1* | 5/2022 | Jo | G06F 3/04184 |
| 2022/0253191 | A1* | 8/2022 | Liu | G06F 3/04166 |
| 2023/0067179 | A1* | 3/2023 | Kim | G06F 1/1616 |
| 2023/0214059 | A1* | 7/2023 | Kim | G06F 3/0412 |
| | | | | 345/55 |
| 2023/0229249 | A1* | 7/2023 | Sasaki | G06F 3/0412 |
| | | | | 345/174 |

FOREIGN PATENT DOCUMENTS

| | | | |
|---|---|---|---|
| CN | 112051942 | A | 12/2020 |
| CN | 112346588 | A | 2/2021 |
| KR | 1020120117465 | A | 10/2012 |

OTHER PUBLICATIONS

Written Opinion of the International Search Authority in International application No. PCT/CN2023/104298, mailed on Dec. 11, 2023, with English translation.

* cited by examiner

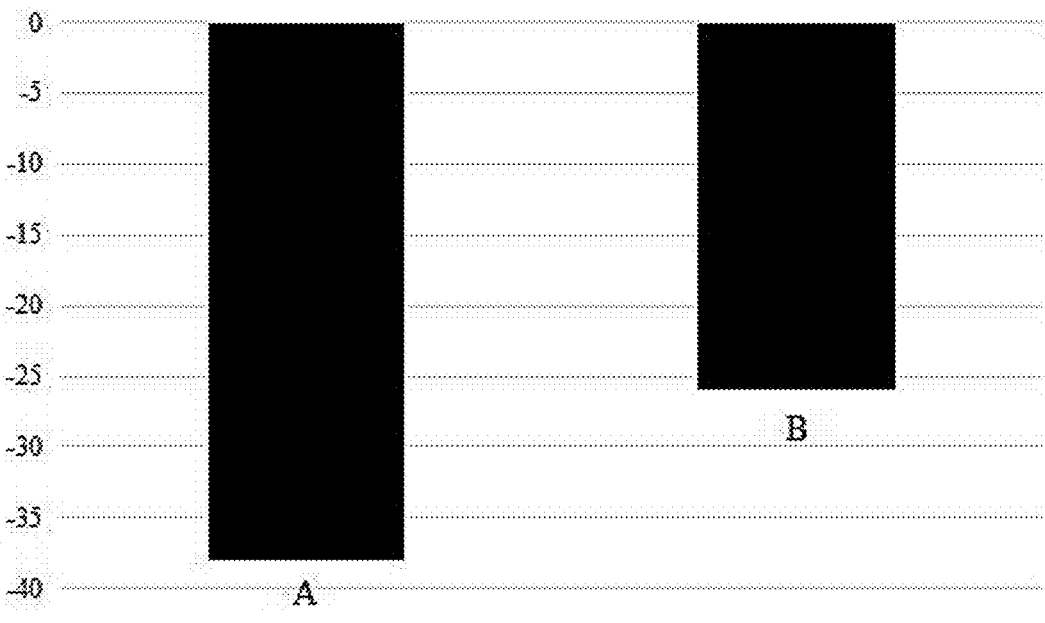

FIG. 5

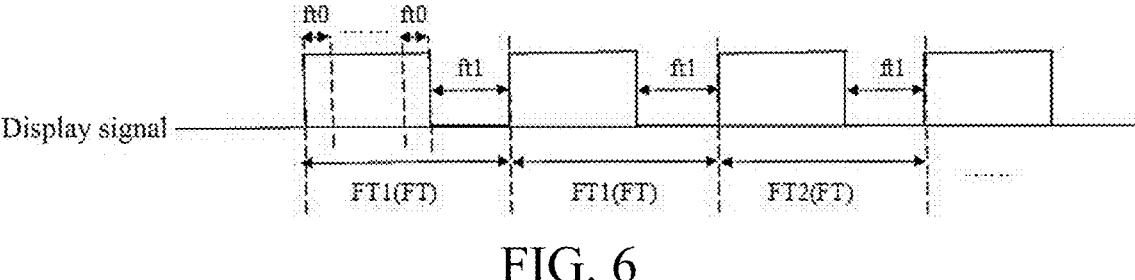

FIG. 6

| Controlling an electromagnetic touch drive circuit to receive a touch identification signal, wherein the touch identification signal includes a touch identification pulse generated by an electromagnetic stylus acting on a display panel | S01 |
|---|---|

| After the touch identification pulse in the touch identification signal, driving the electromagnetic touch drive circuit to provide an electromagnetic touch scanning signal during a sub-blanking time period in a first type of frame period | S02 |
|---|---|

FIG. 7

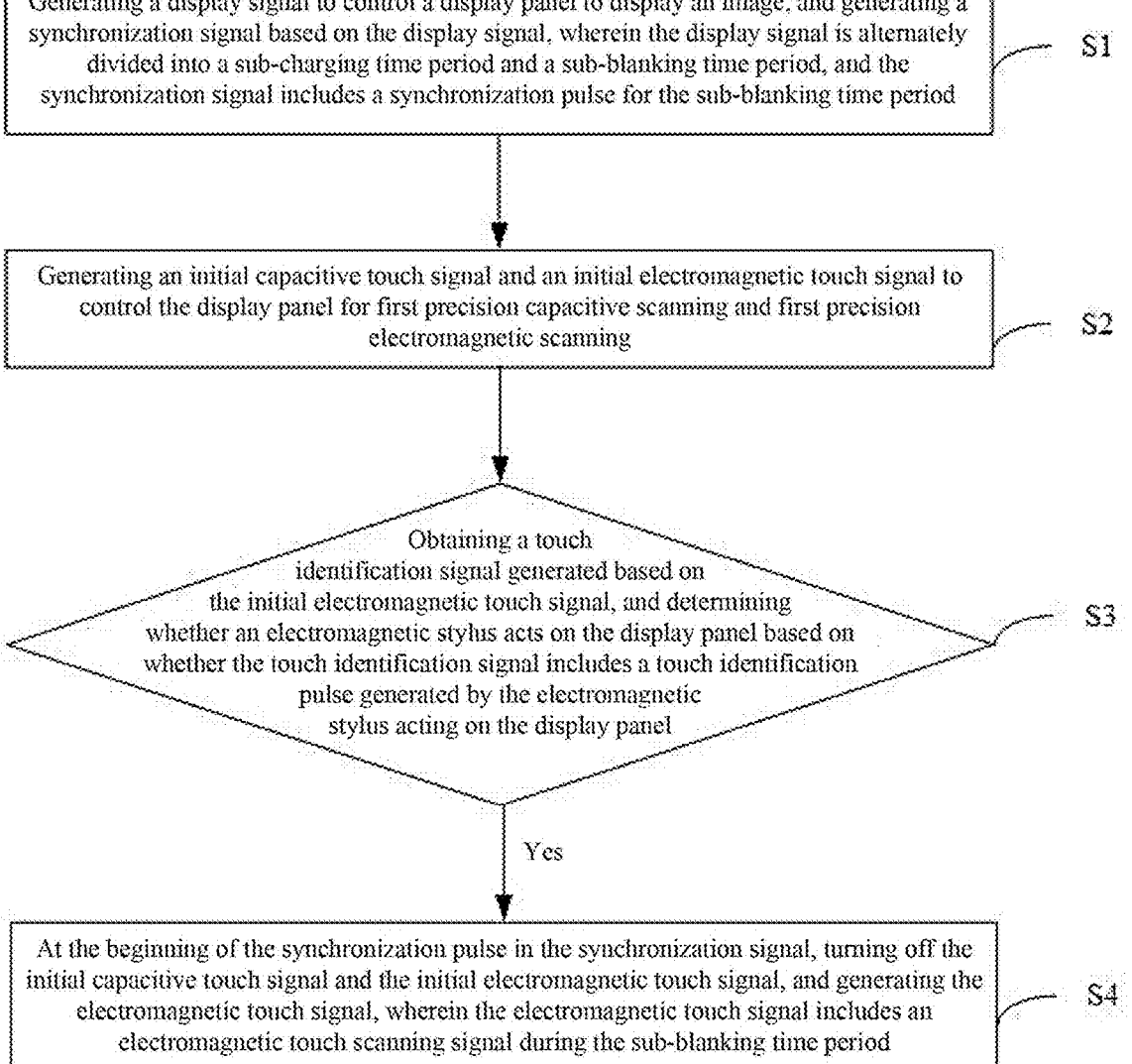

Generating a display signal to control a display panel to display an image, and generating a synchronization signal based on the display signal, wherein the display signal is alternately divided into a sub-charging time period and a sub-blanking time period, and the synchronization signal includes a synchronization pulse for the sub-blanking time period — S1

Generating an initial capacitive touch signal and an initial electromagnetic touch signal to control the display panel for first precision capacitive scanning and first precision electromagnetic scanning — S2

Obtaining a touch identification signal generated based on the initial electromagnetic touch signal, and determining whether an electromagnetic stylus acts on the display panel based on whether the touch identification signal includes a touch identification pulse generated by the electromagnetic stylus acting on the display panel — S3

Yes

At the beginning of the synchronization pulse in the synchronization signal, turning off the initial capacitive touch signal and the initial electromagnetic touch signal, and generating the electromagnetic touch signal, wherein the electromagnetic touch signal includes an electromagnetic touch scanning signal during the sub-blanking time period — S4

FIG. 8

DISPLAY PANEL, DRIVING METHOD THEREOF, AND ELECTRONIC TERMINAL

CROSS-REFERENCE TO RELATED APPLICATION

This application is a continuation-in-part application of U.S. application Ser. No. 18/560,150, filed on Nov. 10, 2023, which is a US national phase application based upon an International Application No. PCT/CN2023/104298, filed on Jun. 29, 2023, which claims priority to Chinese Patent Application No. 202310644115.3, filed with the Chinese Patent Office on May 31, 2023. The entire disclosures of the above applications are incorporated herein by reference.

TECHNICAL FIELD

The present disclosure relates to a display technology field, and in particular, to manufacturing of a display device, specifically to a display panel and driving method thereof, and an electronic terminal.

BACKGROUND

In the field of small-sized and medium-sized displays, an integrated technology has become a current key research and development direction. An electromagnetic touch technology is very suitable for styluses with various functional requirements due to good writing experience, low delay, and high accuracy therefor.

Currently, if a time period for display scanning of a touch screen with an integrated design overlaps with a time period for electromagnetic touch scanning, a frequency band of a display signal and a frequency band of an electromagnetic wave generated by the electromagnetic stylus will interfere with each other, resulting in inaccurate sampling of an electromagnetic touch scanning signal of the electromagnetic stylus. However, if the electromagnetic touch scanning is only performed during a field blanking time period between two frames of adjacent images, an electromagnetic touch report rate will only be less than or equal to a display refresh rate. This greatly reduces reliability of an electromagnetic touch function of the touch screen.

Therefore, a conventional touch screen with the integrated design has the foregoing problem of low reliability of the electromagnetic touch function, and needs to be alleviated urgently.

SUMMARY

An objective of the present disclosure is to provide a display panel and a driving method thereof, and an electronic terminal to alleviate a problem of low reliability of an electromagnetic touch function caused by a low report rate of a conventional touch screen with an integrated design.

An embodiment of the present disclosure provides a display panel. The display panel includes a drive circuit, wherein the drive circuit includes a timing circuit, a gate drive circuit, and an electromagnetic touch drive circuit.

The timing circuit is configured to provide a frame synchronization signal, wherein the frame synchronization signal has a frame period, and the frame period includes a plurality of sub-periods.

Each sub-period includes a sub-charging time period and a sub-blanking time period, the frame period includes a first type of frame period, and the gate drive circuit is configured to provide a display pulse during the sub-charging time period.

In the first type of frame period, the electromagnetic touch drive circuit is configured to provide an electromagnetic touch scanning signal during the sub-blanking time period, wherein the electromagnetic touch scanning signal is a pulse signal, and the electromagnetic touch scanning signal includes a plurality of sub-electromagnetic touch pulses.

In an embodiment, the electromagnetic touch drive circuit is configured to provide electromagnetic touch scanning signal during each sub-blanking time period in the sub-period of the first type of frame period.

In an embodiment, the electromagnetic touch drive circuit is electrically connected to a plurality of electromagnetic touch electrode groups, and in the first type of frame period, duration of a sub-blanking time period is equal to or greater than duration of the plurality of electromagnetic touch electrode groups to transmit one report to the electromagnetic touch drive circuit.

The electromagnetic touch drive circuit provides at least two sub-electromagnetic touch pulses during a corresponding sub-blanking time period, so that at least two corresponding electromagnetic touch electrode groups transmit the report once, and the at least two sub-electromagnetic touch pulses correspond to the at least two electromagnetic touch electrode groups.

In an embodiment, in the first type of frame period, the electromagnetic touch drive circuit provides at least three sub-electromagnetic touch pulses during the corresponding sub-blanking time period, so that at least three electromagnetic touch electrode groups transmit the report once.

In an embodiment, the plurality of electromagnetic touch electrode groups include a first electromagnetic touch electrode group and a second electromagnetic touch electrode group.

In an embodiment, the first type of frame period includes a first type of sub-frame period and a second type of sub-frame period.

The number of the sub-electromagnetic touch pulses of the electromagnetic touch scanning signal during the sub-blanking time period in the first type of sub-frame period is different from the number of the sub-electromagnetic touch pulses of the electromagnetic touch scanning signal during the sub-blanking time period in the second type of sub-frame period.

In an embodiment, the display panel further includes a synchronization circuit to provide a synchronization signal, each synchronization pulse of the synchronization signal has a rising edge and a falling edge.

The electromagnetic touch drive circuit provides the electromagnetic touch pulse during the sub-blanking time period close to the rising edge or the falling edge of the synchronization pulse.

In an embodiment, the electromagnetic touch drive circuit provides the electromagnetic touch pulse during the sub-blanking time period close to the rising edge of the synchronization pulse.

A pulse width of the synchronization signal is greater than or equal to duration of the sub-blanking time period.

In an embodiment, the display panel has a first working time period and a second working time period following the first working time period, the frame period in the second working time period includes the first type of frame period.

The electromagnetic touch drive circuit is configured to provide a touch identification signal during the first working time period, wherein the touch identification signal includes a touch identification pulse, and an electromagnetic signal of an electromagnetic stylus is scanned during a time period of the touch identification pulse.

The display panel is switched to the second working time period after the touch identification pulse in the electromagnetic touch identification signal.

In an embodiment, the drive circuit further includes a capacitive touch drive circuit, and the plurality of frame periods further includes a second type of frame period.

In the second type of frame period, the gate drive circuit is configured to provide the display pulse during the sub-charging time period, and the capacitive touch drive circuit is configured to provide a capacitive touch pulse during the sub-blanking time period.

In an embodiment, the drive circuit further includes a pixel drive circuit, the pixel drive circuit includes a pixel drive transistor, and a constituent material of the pixel drive transistor includes low-temperature polysilicon.

An embodiment of the present disclosure provides a driving method of a display panel, for driving the display panel according to any one of the implementations. The driving method includes:

> driving the electromagnetic touch drive circuit to provide the electromagnetic touch scanning signal during the sub-blanking time period in the first type of frame period.

In an embodiment, the step of driving the electromagnetic touch drive circuit to provide the electromagnetic touch scanning signal during the sub-blanking time period in the first type of frame period includes:

> controlling the electromagnetic touch drive circuit to receive a touch identification signal, wherein the touch identification signal includes a touch identification pulse, and the electromagnetic signal of the electromagnetic stylus is scanned during the time period of the touch identification pulse;
> after the touch identification pulse in the touch identification signal, driving the electromagnetic touch drive circuit to provide the electromagnetic touch scanning signal during the sub-blanking time period in the first type of frame period.

An embodiment of the present disclosure provides an electronic terminal. The electronic terminal includes the display panel according to any one of the implementations.

Beneficial Effects

The present disclosure provides a display panel and a driving method therefor, and an electronic terminal. The display panel includes a drive circuit. The drive circuit includes a timing circuit, a gate drive circuit, and an electromagnetic touch drive circuit. The timing circuit is configured to provide a frame synchronization signal. The frame synchronization signal has a frame period, and the frame period includes a plurality of sub-periods. Each sub-period includes a sub-charging time period and a sub-blanking time period. The frame period includes a first type of frame period. In the first type of frame period, the gate drive circuit is configured to provide a display pulse during the sub-charging time period. The electromagnetic touch drive circuit is configured to provide an electromagnetic touch scanning signal during the sub-blanking time period. It may be understood that an originally continuous and complete electromagnetic touch scanning signal is split into a plurality of electromagnetic touch scanning signals, so that the electromagnetic touch drive circuit is generated during the sub-blanking time period, thereby improving reliability and a report rate of an electromagnetic touch function.

BRIEF DESCRIPTION OF DRAWINGS

The present disclosure will be further described below with reference to the accompanying drawings. It should be noted that the accompanying drawings in the following description are only intended to illustrate some embodiments of the present disclosure. For a person skilled in the art, other accompanying drawings may also be obtained based on these accompanying drawings without creative efforts.

FIGS. 1 to 4 and 6 are waveform diagrams of some signals in a display panel according to an embodiment of the present disclosure.

FIG. 5 is a bar graph of noise data according to an embodiment of the present disclosure.

FIG. 7 is a flow chart of a driving method of a display panel according to an embodiment of the present disclosure.

FIG. 8 is a flow chart of a driving method of a display panel according to another embodiment of the present disclosure.

DETAILED DESCRIPTION OF EMBODIMENTS

The technical solutions of the embodiments of the present disclosure are clearly and completely described below with reference to the accompanying drawings of the embodiments of the present disclosure. Apparently, the described embodiments are merely a part of but not all of the embodiments of the present disclosure. All other embodiments obtained by a person skilled in the art based on the embodiments of the present disclosure without creative efforts shall fall within the protection scope of the present disclosure.

In the description of the present disclosure, it should be understood that orientation or positional relationships indicated by the terms, such as "forward", "backward", "previous" are based on orientation or positional relationship shown in the accompanying drawings. The foregoing orientation or positional relationships are only for ease of describing the present disclosure and simplifying the description, rather than indicating or implying that the mentioned device or element needs to have a particular orientation, or must be constructed and operated in a particular orientation. Therefore, such terms cannot be constructed as a limitation of the present disclosure. In addition, terms "first", "second" and the like are used merely for a purpose of description, and shall not be construed as indicating or implying relative importance or implying the number of indicated technical features. Therefore, the feature limited by "first" or "second" may explicitly or implicitly include one or more of the features. In the descriptions of the present disclosure, "a plurality of" means two or more, unless otherwise definitely and specifically limited, "electrically connected" means that there is a connection between two elements, and is not limited to a direct connection or an indirect connection.

In addition, it should be noted that the accompanying drawings only provide structures and steps that are closely related to the present disclosure, and some details that are not closely related to the present disclosure are omitted. The purpose is to simplify the accompanying drawings and make disclosure points clear at a glance, rather than indicating that an actual device is exactly same as the accompanying drawings and is not limited to the actual device.

The present disclosure provides a display panel. The display panel may include but is not limited to the following embodiments and combinations of the following embodiments. The display panel includes, but is not limited to, a liquid crystal display panel, but may be an organic self-luminous display panel, an inorganic self-luminous direct display panel.

Figure 12:
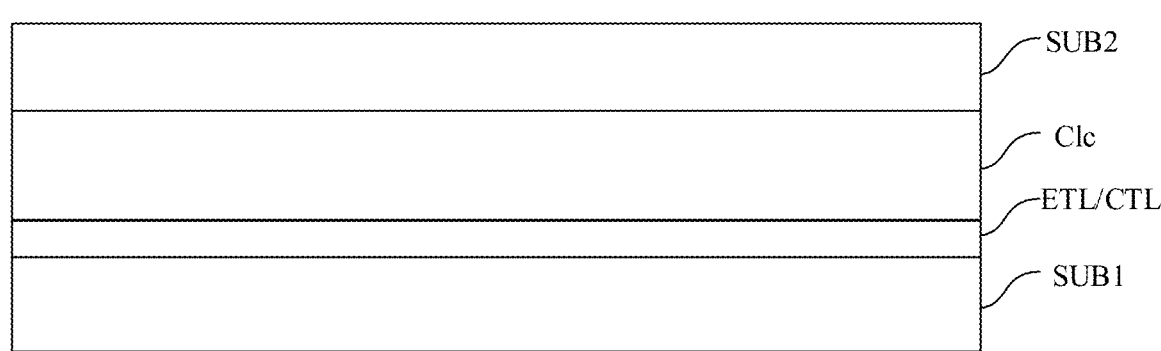
FIG. 12 is a cross-section diagram of a display panel according to an embodiment of the present disclosure.

The display panel 10 includes a first substrate (e.g., SUB1 of FIG. 12) and a second substrate (e.g., SUB2 of FIG. 12) disposed opposite to each other in a vertical direction perpendicular to an upper surface of the substrate, and a liquid crystal layer (e.g., Clc of FIG. 12) disposed between the first substrate and the second substrate. The first substrate may be any of an array substrate and a color film substrate, the second substrate may be another one of the array substrate and the color film substrate.

As an example, the first substrate is described herein as the array substrate and the second substrate is described herein as the color film substrate. In the vertical direction perpendicular to the array substrate and the color film substrate, an electromagnetic induction layer (e.g., the ETL of FIG. 12) and/or a capacitive touch layer (e.g., the CTL of FIG. 12) is provided at a side of the array substrate close to the liquid crystal layer. The electromagnetic induction layer and the capacitive touch layer may be laminated or provided in the same layer, and there is no limitation on the positional relationship of the electromagnetic induction layer and the capacitive touch layer on the array substrate.

The array substrate includes a plurality of sub-pixels arranged in a matrix in a plan view of the display panel and a signal line set.

The signal line set includes a plurality of gate lines extending in a first direction X, a plurality of data lines extending in a second direction Y, and a plurality of sub-pixels. The first direction crosses the second direction. The gate lines are connected to a gate driver circuit and the data lines are connected to a source driver circuit.

The sub-pixel is configured to emit light in response to a signal from the data line. Each sub-pixel is connected to a corresponding data line and a corresponding gate line.

The electromagnetic induction layer includes a plurality of electromagnetic touch electrode groups, the electromagnetic touch electrode group may be metallic electromagnetic induction coils, and the plurality of electromagnetic touch electrode groups are electrically connected to an electromagnetic touch drive circuit. The electromagnetic touch drive circuit may be disposed at a layer same as that of the electromagnetic touch electrode groups, or at a layer different from that of the electromagnetic touch electrode groups.

The capacitive touch layer may include a plurality of capacitive touch control electrode groups, the capacitive touch control electrode groups may include a plurality of metal electrodes arranged in the first and second directions, the metal electrodes extending in the first direction may be disposed in a different layer from the metal electrodes extending in the second direction, and the plurality of capacitive touch control electrode groups are electrically connected to a capacitive touch drive circuit. The capacitive touch drive circuit may be disposed at a layer same as that of the capacitive touch control electrode groups, or at a layer different from that of the capacitive touch control electrode groups.

In an embodiment, the electromagnetic induction layer being provided on an array substrate is described as an example, where the electromagnetic induction layer is provided at a side of the array substrate close to the liquid crystal layer. As shown in FIGS. 1 to 5 and 9, the display panel 10 includes a drive circuit 100 for driving the display panel 10 to display images and for touch control, a plurality of sub-pixels 210, a plurality of electromagnetic touch electrode groups for transmitting an electromagnetic touch scanning signal, a plurality of gate lines for transmitting a display signal DS, a plurality of data lines for transmitting a data signal. The display panel 10 includes an active area AA where the sub-pixels 210 and electrodes for touch control are located and a non-active area where the drive circuit 100 is located, the non-active area surrounding the active area AA in the plan view.

Figure 9:
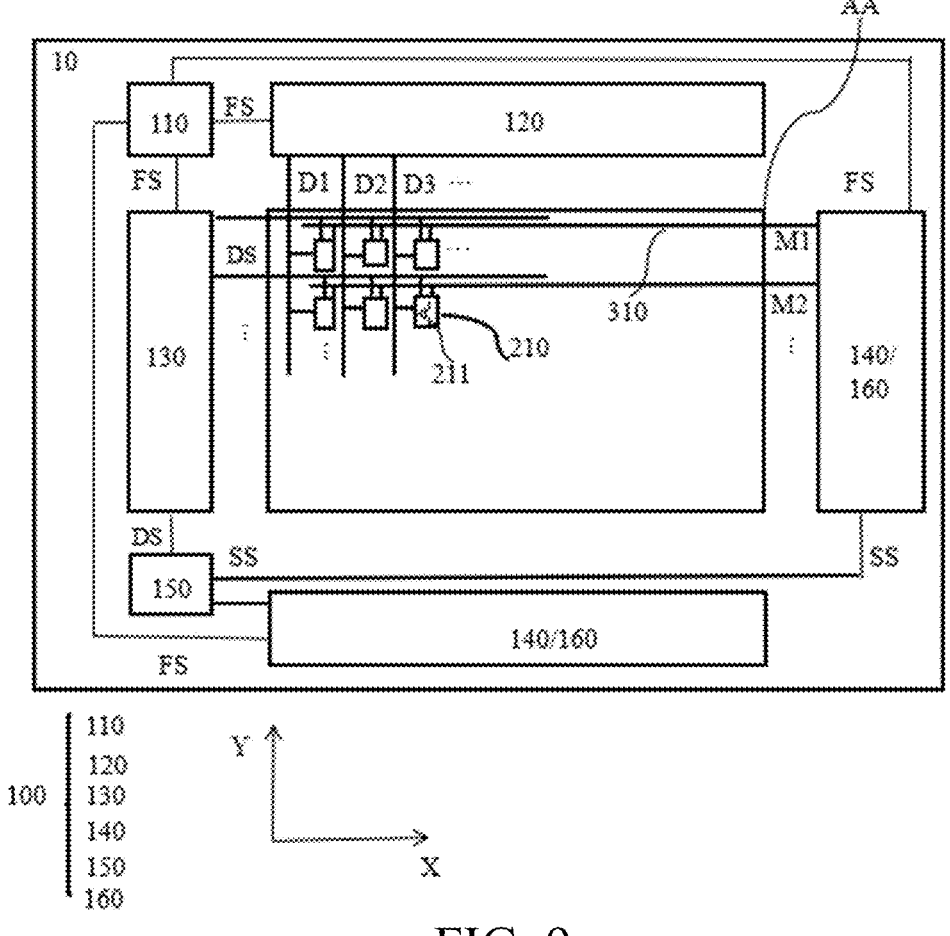
FIG. 9 is a schematic block diagram of a display panel with sub-pixels according to an embodiment of the present disclosure.
Figure 11:
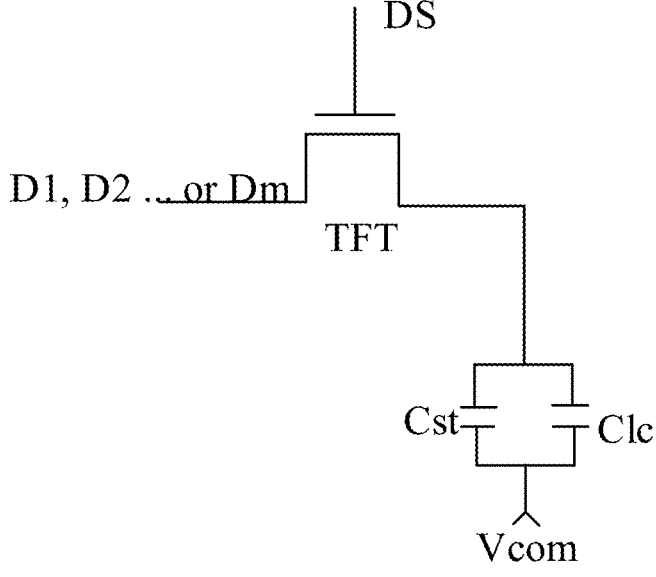
FIG. 11 is a waveform diagram of a pixel drive circuit in a sub-pixel according to an embodiment of the present disclosure.

The sub-pixels may be arranged in a matrix in the light emitting device layer in the active area AA (see FIG. 9). As shown in FIG. 11, each sub-pixel includes a liquid crystal unit Clc, a storage capacitor Cst, and a corresponding pixel drive circuit 211. The storage capacitor Cst includes a pixel electrode and a common electrode laminated and insulated from each other. Each pixel electrode is electrically connected to a corresponding one of the data lines. In some embodiments of the present disclosure, a plurality of common electrodes of at least a portion of the sub-pixels receive a same common voltage. The liquid crystal unit Clc may be provided in parallel with the storage capacitor Cst, but the present disclosure is not limited thereto.

Figure 10:
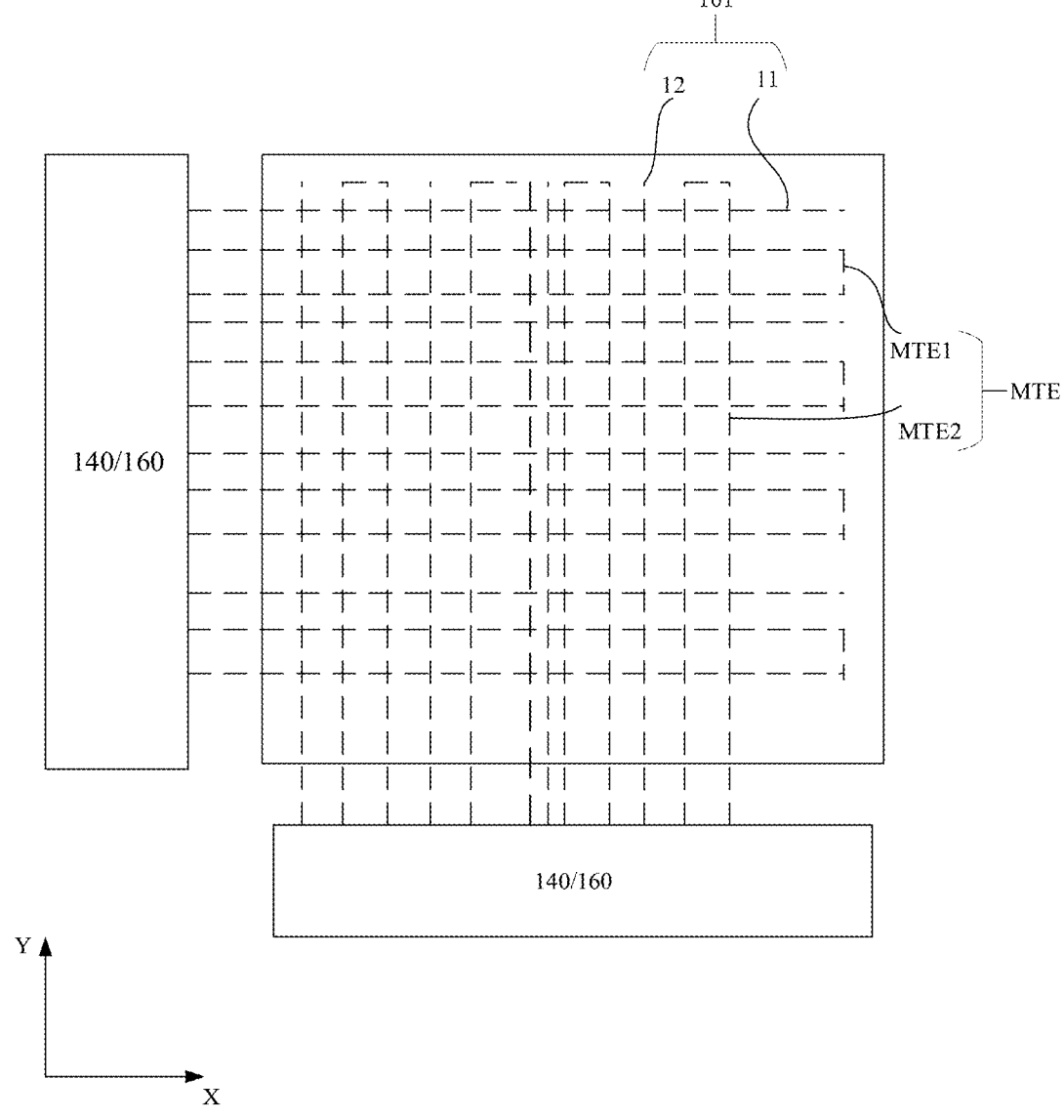
FIG. 10 is a schematic block diagram of a display panel with electromagnetic touch electrode groups according to an embodiment of the present disclosure.

The electromagnetic touch electrode groups may be arranged in the electromagnetic induction layer (see FIG. 10).

The drive circuit 100 is configured to drive the display panel 10 (specifically, the display panel 10 in the active area AA for touch control as well as for displaying an image) to display an image.

The drive circuit 100 includes a timing circuit 110, a source drive circuit 120, a gate drive circuit 130, and an electromagnetic touch drive circuit 140. The timing circuit 110 is connected to the source drive circuit 120, the gate drive circuit 130, and the electromagnetic touch drive circuit 140 and configured to provide a frame synchronization signal FS to at least one of the source drive circuit 120, the gate drive circuit 130, or the electromagnetic touch drive circuit 140. The frame synchronization signal FS has a frame period.

Figures 1, 2, 3:
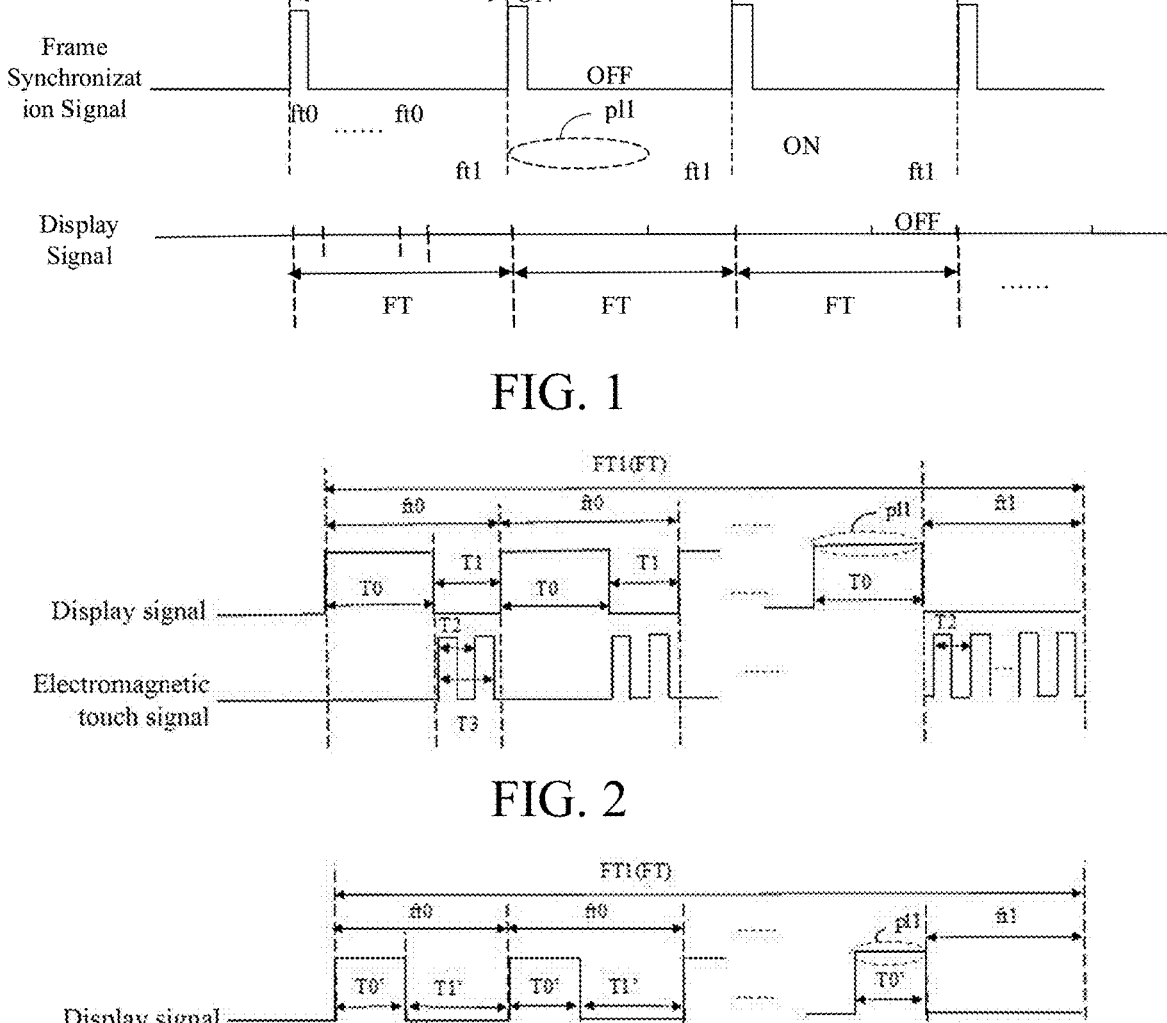

The gate drive circuit 130 may be connected to the timing circuit 110 and the sub-pixels in the active area AA and provide a display signal DS to each row of sub-pixels 210 in an active area AA of the display panel for display in response to the frame synchronization signal FS from the timing circuit 110. The source drive circuit 120 may be connected to the timing circuit 110 and the sub-pixels and provide data signals D1, D2, D3 . . . Dm to respective columns of sub-pixels 210 in response to the frame synchronization signal FS. The display signal DS may switch from an inactive state (e.g., an OFF state) to an active state (e.g., an ON state) in response to a rising edge of the frame synchronization signal FS, but the present disclose is not limited hereto, and the display signal DS may switch from an inactive state (e.g., an OFF state) to an active state (e.g., an ON state) in response to a falling edge of the frame synchronization signal FS. The display signal DS may have a frame period FT having a same duration as that of the frame period of the frame synchronization signal FS. The frame period FT of the display signal DS may include a first type of frame period FT1 (as shown in FIG. 2). The first type of frame period FT1 may include a plurality of sub-periods ft0 and a blanking time period ft1. Each sub-period ft0 includes a sub-charging time period TO and a sub-blanking time period T1. A portion of the display signal DS in the sub-charging period TO is called a display pulse pl1. The gate drive circuit 130 may provide a display pulse pl1 to a row of the sub-pixels 210 (i.e., the common electrode of the sub-pixel) in the sub-charging period TO in response to the frame synchronization signal FS from the timing circuit 110, to turn on the corresponding row of the sub-pixels, so that the sub-pixels emit light according to the data signals D1, D2, D3 . . . Dm from the source drive circuit 12.

The electromagnetic touch drive circuit 140 is connected to the gate drive circuit 130 and the sub-pixel and configured to transmits/receives an electromagnetic touch scanning signal M1, M2 . . . Mn to/from the electromagnetic touch electrode group MTE during the first type of frame period (e.g., the sub-blanking time period T1 of the display signal DS) in response to the display signal DS from the gate drive circuit 130. Although FIG. 10 shows that the electromagnetic touch electrode group MTE may include a first electromagnetic touch electrode group MTE1 extending along a first direction X and a second electromagnetic touch electrode group MTE2 extending along a second direction Y different from the first direction X, the present disclosure is not limited thereto.

When an electromagnetic touch pen approaches or contacts the display panel, the electromagnetic touch electrode group MTE at the touch position generates an induced current, by scanning the current changes of the electromagnetic touch electrode group MTE across all areas of the display panel by using the electromagnetic touch scanning signal transmitted from the touch drive circuit 140, it may be determined that the area of the display panel corresponding to the electromagnetic touch electrode group MTE generating the induced current is the touch position.

Therefore, the frame period FT includes a first type of frame period FT1. In the first type of frame period FT1, the gate drive circuit 130 is configured to provide a display pulse pl1 during the sub-charging time period TO. The electromagnetic touch drive circuit is configured to provide an electromagnetic touch scanning signal during the sub-blanking time period T1. It may be considered that an electromagnetic touch scanning signal generated by the electromagnetic touch drive circuit includes a plurality of electromagnetic touch scanning signals located in a plurality of sub-blanking time periods T1 respectively.

An example in which each gate line is electrically connected to a plurality of pixel drive circuits corresponding to a plurality of sub-pixels in a corresponding row (that is, one of the foregoing pixel groups in a row), and each data line is connected to a plurality of pixel drive units corresponding to a plurality of sub-pixels in a corresponding column is used for description. FIG. 11 shows an example of a pixel drive circuit 211, but the configuration of the pixel drive circuit 211 is not limited thereto. The pixel drive circuit 211 may include a transistor TFT. The transistor TFT includes a gate connected to the gate line to receive a display signal DS from the gate line, a first electrode connected to the data line to receive a data signal D1, D2, . . . , or Dm from the data line, and a second electrode connected to a first electrode plate of the liquid crystal unit Clc. The liquid crystal unit Clc has the first electrode plate (e.g. pixel electrode) and a second electrode plate (e.g. common electrode) receiving the common voltage Vcom. The common voltage Vcom is commonly applied to at least one of the plurality of sub-pixels. When the display signal DS is switched to an active state (e.g., an ON state), the sub-pixel emits light according to the data signal D1, D2, . . . , or Dm.

Specifically, during an image display process of the display panel, scanning always starts from an upper left corner of an image and proceeds horizontally forward until the scanning reaches an upper right corner of the image. This process means that a corresponding scan line (or be referred to be gate line) transmits a corresponding effective gate pulses (such as pl1 in FIG. 2, a portion of the display signal DS that is in the ON state) in a gate signal (or be referred to be the display signals DS) to the sub-pixels in an order from the leftmost sub-pixel of a first row to the rightmost sub-pixel of the first row sequentially, and at this point, a scan point quickly returns to the left and resumes scanning at a second row below the first row. The return process of the scan point between rows is called horizontal blanking process, and duration thereof may be called a horizontal blanking (Hblank) time period (or referred to be the sub-blanking time period T1), which is the foregoing sub-blanking time period T1. After scanning the sub-pixels of all rows in this way, it is necessary to return from a lower right corner of the picture to the upper left corner of the picture to start new scanning. The process of returning the scanning point from the lower right corner of the picture to the upper left corner of the picture is called vertical blanking, and duration thereof may be called a vertical blanking (VBlank) time period (or be referred to be the blanking time period ft1).

Specifically, as shown in FIGS. 1 to 5, the display panel may display an image based on a display signal. With reference to the discussion above, the display signal may be divided based on a plurality of frame periods FT. The frame period FT includes a plurality of sub-periods ft0 and a blanking time period ft1 (that is, VBlank) before the next frame time period TF. During a former sub-charging time period TO in a sub-period ft0, a corresponding scan line may sequentially transmit a corresponding effective gate pulses to the sub-pixels in an order from the leftmost sub-pixel to the rightmost sub-pixel in the corresponding row to start a corresponding pixel group. In addition, the plurality of data lines are respectively connected to corresponding columns of sub-pixels. When a corresponding pixel group is started, the plurality of data lines may respectively transmit the plurality of data signals transmitted in this case to the plurality of sub-pixels in the pixel group, to implement luminescence of sub-pixels in this row. Moreover, before the next scan line transmits the corresponding effective gate pulses to the sub-pixels in an order from the leftmost sub-pixel to the rightmost sub-pixel in the corresponding row, there is a corresponding horizontal blanking (Hblank) time period, that is, the foregoing sub-blanking time period T1. In particular, as discussed above, after the last scan line sequentially transmits the corresponding effective gate pulses from the leftmost sub-pixel to the rightmost sub-pixel in the corresponding row, the luminescence of all sub-pixels in a frame may be completed. In this case, after the last sub-charging time period TO, a corresponding vertical blanking (VBlank) time period, that is, the foregoing blanking time period ft1, needs to be passed before the first row of sub-pixels may be restarted to drive display the next frame of picture.

It may be understood that in the present embodiment, in a time dimension, at least the first type of frame period FT1 in the plurality of frame periods FT is used only for the electromagnetic touch drive circuit to provide the electromagnetic touch scanning signal during the sub-blanking time period, and this time period is the corresponding sub-blanking time period T1. It may be understood that an originally continuous and complete electromagnetic touch scanning signal is split into a plurality of electromagnetic touch scanning signals each separately provided during the sub-blanking time period T1. This may achieve at least the following effects.

Since during the sub-blanking time period T1, a plurality of scan lines do not need to transmit scanning signals to a plurality of rows of sub-pixels, and a plurality of data signals do not need to transmit data signals to a plurality of columns of sub-pixels, the electromagnetic touch scanning signal in the present embodiment may avoid crosstalk with scanning signals and data signals, improving reliability of an electromagnetic touch function. In addition, in the present embodiment, there is a first type of frame period FT1 specifically used to provide the electromagnetic touch scanning signal. The sub-blanking time period T1 is used to provide the electromagnetic touch scanning signal, which may avoid transmitting other electrical signals during the sub-blanking time period T1 in the first type of frame period FT1. The number of sub-blanking time periods T1 used to provide the electromagnetic touch scanning signal in the first type of frame period FT1 may be selected according to requirements related to the electromagnetic touch scanning signal, which is beneficial to improving a report rate of an electromagnetic touch function.

Figure 4:
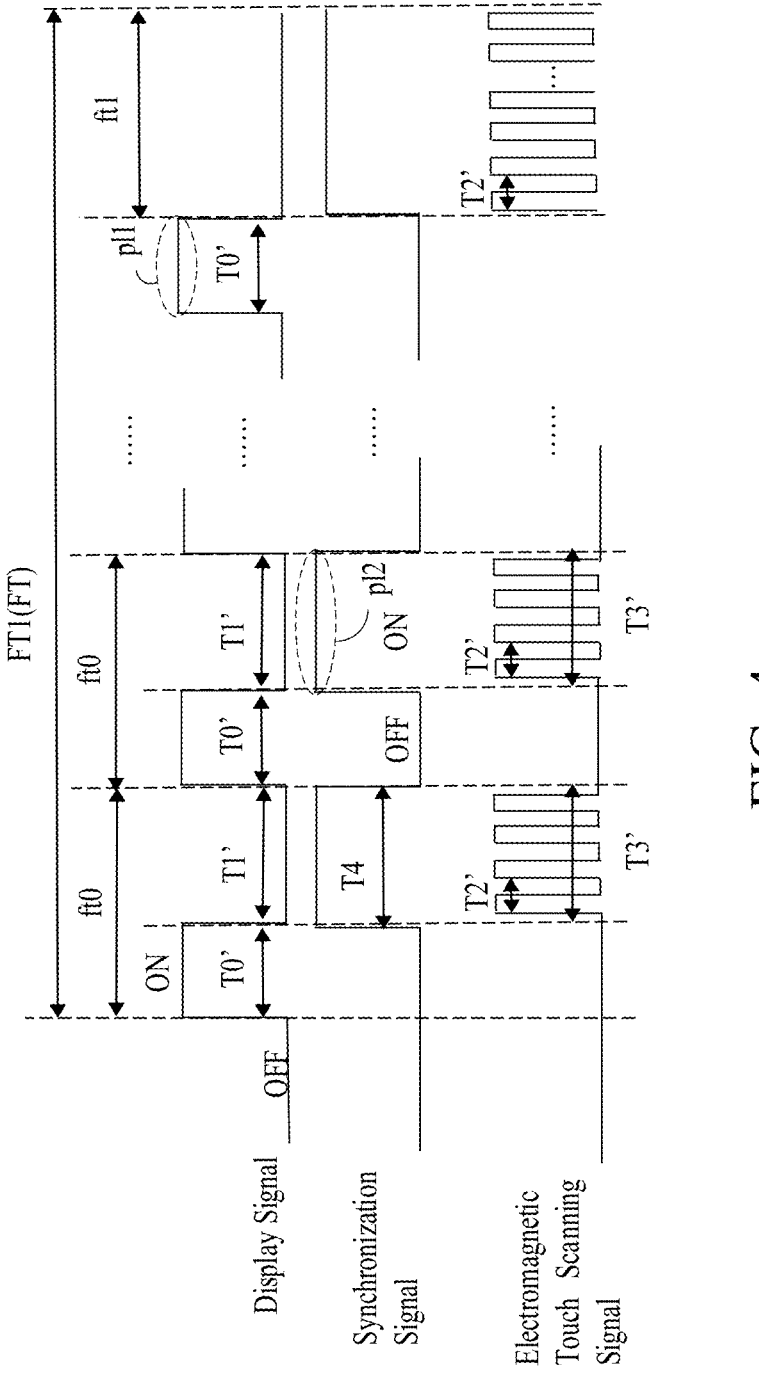

Furthermore, to increase duration for providing the electromagnetic touch scanning signal, as shown in FIGS. 2 to 4, it is also possible to control a plurality of electromagnetic touch electrode groups to provide electromagnetic touch scanning signals to the electromagnetic touch drive circuit 140 during the blanking time period ft1 between the last sub-charging time period TO in the previous frame period FT and the first sub-charging time period TO in the current frame period FT.

In an embodiment, with reference to FIGS. 1 to 5, the electromagnetic touch drive circuit is configured to provide, in the sub-period ft0 of the first type of frame period FT1, the electromagnetic touch scanning signal during each sub-blanking time period T1.

It may be understood that in the present embodiment, each sub-blanking time period T1 in the sub-period ft0 of the first type of frame period FT1 is set to provide the electromagnetic touch scanning signal for the electromagnetic touch drive circuit, maximizing the utilization of all time periods in the first type of frame period FT1 that do not overlap and outside the sub-charging time period TO, so that duration that may be used to provide the electromagnetic touch scanning signal to the electromagnetic touch drive circuit in the first type of frame period FT1 may be maximized, to further improve a report rate of an electromagnetic touch function.

As shown in FIG. 2, it may be considered that the electromagnetic touch drive circuit 140 transmits a corresponding sub-electromagnetic touch pulse (i.e., a portion of the sub-electromagnetic touch signal in the whole period (T2) thereof) to each electromagnetic touch electrode group. Duration occupied by transmitting each sub-electromagnetic touch pulse may be T2. If two sub-electromagnetic touch pulses are transmitted, a duration T3 occupied by transmitting two sub-electromagnetic touch pulses may be considered less than 2×T2, because after the last sub-electromagnetic touch pulse is transmitted, it is unnecessary to wait for a time interval before transmitting the next sub-electromagnetic touch pulse, the occupied duration may be less than T2.

In an embodiment, with reference to FIGS. 1 to 3, in the first type of frame period FT1, a duration of the sub-blanking time period T1 is equal to or greater than duration for the plurality of electromagnetic touch electrode groups to transmit a report once to the electromagnetic touch drive circuit. The electromagnetic touch scanning signal is a pulse signal (for example, including a plurality of pulses). The electromagnetic touch scanning signal includes at least two sub-electromagnetic touch pulses corresponding to at least two electromagnetic touch electrode groups respectively. The electromagnetic touch drive circuit is configured to provide the at least two sub-electromagnetic touch pulses during a corresponding sub-blanking time period, so that at least two corresponding electromagnetic touch electrode groups transmit the report once.

It should be noted that considering that the sub-blanking time period T1 in each frame period FT is generally small, it may be difficult to implement one report. Based on this, the drive circuit also includes a pixel drive circuit 210. The pixel drive circuit 210 includes a pixel drive transistor (such as TFT in FIG. 11). In the present embodiment, the pixel drive transistor may be made of materials including but not limited to low-temperature polysilicon to achieve shorting the sub-charging time period T0 in each frame period FT to T0'. Correspondingly, the sub-blanking time period T1 is relatively extended to T1'. This may further extend duration available for providing the electromagnetic touch scanning signal in the first type of frame period FT1, to further increase a report rate of an electromagnetic touch function.

In an embodiment, with reference FIGS. 1 to 3, in the first type of frame period FT1, the electromagnetic touch drive circuit provides three corresponding sub-electromagnetic touch pulses during the corresponding sub-blanking time period T1, so that at least three corresponding electromagnetic touch electrode groups transmit the report once. In the present embodiment, transmission of each report is limited to requiring three electromagnetic touch electrode groups to feed to the electromagnetic touch drive circuit based on the three corresponding sub-electromagnetic touch pulses. In other words, it is considered that after the electromagnetic touch drive circuit receives the three pieces of corresponding feedback, data is reported once. For example, in the present embodiment, it may be determined, based on the three pieces of feedback provided by three continuously arranged electromagnetic touch electrode groups, whether there is a touch at a position (a position in which the three electromagnetic touch electrode groups are located or a position in which the middle electromagnetic touch electrode group is located) from the user or an outside device. This may achieve high electromagnetic touch accuracy.

Following the discussion above, when the sub-charging time period T0 in the frame period FT is shorted to T0', correspondingly, the sub-blanking time period T1 is relatively extended to T1', based on a specific T2 (duration occupied by transmitting the sub-electromagnetic touch pulse), an amount of T2 that may be accommodated in the period T1' increases. For example, it may be considered that three sub-electromagnetic touch pulses may be implemented during the sub-blanking time period T1' to transmit the report once, and corresponding occupied duration T3' (refer to the definition of T3 above) also increases compared with T3.

In an embodiment, the plurality of electromagnetic touch electrode groups MTE include a first electromagnetic touch electrode group MTE1 extending along a first direction X and a second electromagnetic touch electrode group MTE2 extending along a second direction Y. Each of the first electromagnetic touch electrode group MTE1 and the second electromagnetic touch electrode group MTE2 may be circular metal routing, but the present disclosure is not limited thereto. The first electromagnetic touch electrode group MTE1 and the second electromagnetic touch electrode group MTE2 may be disposed at different layers in electromagnetic induction layer with multi-layer structure, but the present disclosure is not limited hereto.

The first electromagnetic touch electrode groups MTE1 are arranged side by side and spaced along the second direction Y, and a first end and a second end of at least one first electromagnetic touch electrode group MTE1 are both electrically connected to the electromagnetic touch drive circuit. The second electromagnetic touch electrode groups MTE2 are arranged side by side and spaced along the first direction X, and a first end and a second end of at least one second electromagnetic touch electrode group MTE2 are both electrically connected to the electromagnetic touch drive circuit. The electromagnetic touch drive circuit may be provided at a side of the display panel close to one edge of the display plane, or may be provided at two sides of the display panel close to two edges of the display plane (as shown in FIG. 10). The first electromagnetic touch electrode group MTE1 and the second electromagnetic touch electrode group MTE2 are insulated from each other. When the electromagnetic touch pen approaches the display device, the first electromagnetic touch electrode group MTE1 and the second electromagnetic touch electrode group MTE2 generate a greater induced current. Therefore, the electromagnetic touch drive circuit may determine a horizontal coordinate and a vertical coordinate of the electromagnetic touch pen touching the screen according to the positions of the first and second electromagnetic touch electrode groups MTE2 which generate the induced current. Then the electromagnetic touch drive circuit may determine the touch position of the electromagnetic touch pen. It can be understood that the above description for the electromagnetic touch electrode group is only an exemplary description, and those skilled in the art can make equivalent modified designs for the electromagnetic touch electrode group.

A pulse width of the sub-electromagnetic touch pulse corresponding to the second electromagnetic touch electrode group close to an edge of the display panel is greater than a pulse width of the sub-electromagnetic touch pulse corresponding to the first electromagnetic touch electrode group at a center of the display panel. It may be understood that in the present embodiment, the pulse width of the sub-electromagnetic touch pulse corresponding to the electromagnetic touch electrode group close to the edge of the display panel is set to be greater than that of the electromagnetic touch electrode group at a center of the display panel. For example, for the first electromagnetic touch electrode group MTE1, the pulse width of the sub-electromagnetic touch pulse corresponding to the first electromagnetic touch electrode group MTE1 gradually increases along the second direction from a center of the display panel to the edge of the display panel. In other word, the pulse width of the sub-electromagnetic touch pulse corresponding to the first electromagnetic touch electrode group close to the edge (one of the edges extending in the first direction X and opposite in the second direction Y) of the display panel is set to be greater than that of the first electromagnetic touch electrode group at a center of the display panel. The above set may also be applied to the second electromagnetic touch electrode group MTE2. To be specific, a longer time may be set to collect feedback of the second electromagnetic touch electrode group, reducing a risk of poor identification accuracy of electromagnetic touch in an edge area.

In an embodiment, the first type of frame period FT1 includes a first type of sub-frame period and a second type of sub-frame period. The number of sub-electromagnetic touch pulses of the electromagnetic touch scanning signal during the sub-blanking time period in the first type of sub-frame period is not equal to the number of sub-electromagnetic touch pulses of the electromagnetic touch scanning signal during the sub-blanking time period in the second type of sub-frame period, and the first and second type of sub-frame periods may be in different ones of the first type of frame periods FT1, respectively, but the present disclosure is not limited hereto.

In the present embodiment, there is no limit on whether a duration of the sub-blanking time period T1 in the first type of sub-frame period is same as that of the second type of sub-frame period. In addition, there is no limit on whether the pulse widths of the sub-electromagnetic touch pulses corresponding to different electromagnetic touch electrode groups are same. Therefore, the number of sub-electromagnetic touch pulses of the electromagnetic touch scanning signal during the sub-blanking time period in the first type of sub-frame period is not equal to the number of sub-electromagnetic touch pulses of the electromagnetic touch scanning signal during the sub-blanking time period in the second type of sub-frame period.

In an embodiment, with reference to FIGS. 1 to 2, the duration of the sub-blanking time period T1 is less than the duration of the plurality of electromagnetic touch electrode groups to transmit one report to the electromagnetic touch drive circuit. The plurality of electromagnetic touch electrode groups is configured to transmit one report during at least two continuously arranged sub-blanking time periods T1. As discussed above, considering that the sub-blanking time period T1 in each frame period FT is generally less, for example, when the duration of the sub-blanking time period T1 is shorter than the duration of the plurality of electromagnetic touch electrode groups to transmit one report to the electromagnetic touch drive circuit, it indicates that one report cannot be transmitted during the sub-blanking time period T1. Based on this, in the present embodiment, the electromagnetic touch drive circuit is disposed to provide, for example, at least three sub-electromagnetic touch pulses during the sub-blanking time period T1 in the first type of frame period FT1 to implement a report transmission, so that duration of one single report is concentrated in at least two continuous sub-blanking time periods T1 to avoid further reduction in a report rate.

Specifically, as shown in FIG. 2, assuming that every time the electromagnetic touch drive circuit provides three sub-electromagnetic touch pulses, the three corresponding electromagnetic touch electrode groups respectively perform feedbacks to report data once. Then, since the electromagnetic touch drive circuit may only be controlled to provide two sub-electromagnetic touch pulses during the sub-blanking time period T1, one report cannot be implemented. Therefore, part of the adjacent sub-blanking time period T1 may also be used to control the electromagnetic touch drive circuit to transmit the remaining one sub-electromagnetic touch pulse, to combine and implement one report. To increase the report rate, each sub-blanking time period T1 may be set to transmit the maximum number of sub-electromagnetic touch pulses. For example, in FIG. 2, each sub-blanking time period time T1 is set to be used to transmit two corresponding sub-electromagnetic touch pulses, then the two sub-electromagnetic touch pulses in the first sub-blanking time period T1 and the a former one of the sub-electromagnetic touch pulses in the second sub-blanking time period T1 next to the first sub-blanking time period T1 are used to control the implementation of the first reported data. In addition, the latter one of the sub-electromagnetic touch pulses of the second sub-blanking time period T1 and the two sub-electromagnetic touch pulses of the third sub-blanking time period T1 next to the second sub-blanking time period T1 are used to control the implementation of the second reported data, and so on.

Certainly, considering that in the first type of frame period FT1, if a plurality of continuous sub-blanking time periods T1 are used for the electromagnetic touch drive circuit to provide the electromagnetic touch scanning signal, horizontal stripes on a displayed picture is caused. Therefore, in the first type of frame period FT1, the plurality of sub-blanking time periods T1 for the electromagnetic touch drive circuit to provide the electromagnetic touch scanning signal are provided at intervals. Furthermore, the number of sub-blanking time periods T1 between every two adjacent sub-blanking time periods T1 for the electromagnetic touch drive circuit to provide the electromagnetic touch scanning signal is different, to further destroy the horizontal stripes, thereby alleviating horizontal stripes.

Furthermore, with reference to FIGS. 1 to 4, the electromagnetic touch drive circuit may be properly disposed to increase a rate at which the electromagnetic touch drive circuit provides the sub-electromagnetic touch pulse. Specifically, duration T2 occupied by transmitting each sub-electromagnetic touch pulse is further shortened to T2'. In this case, during a same sub-blanking time period (T1 or T1'), the number of sub-electromagnetic touch pulses that may be provided may also be increased. For example, compared with FIG. 3, FIG. 4 shows that the number of sub-electromagnetic touch pulses that may be provided may be increased from three to four. In this way, the report rate may be increased when a report accuracy is specific, or the report accuracy may be increased when the report rate is specific (for example, data is reported once every four sub-electromagnetic touch pulses are provided).

Furthermore, considering that the report of the electromagnetic touch function may change, the number of sub-electromagnetic touch pulses may be provided as same as the number of corresponding sub-electromagnetic touch pulses required for the report during the sub-blanking time period T1 based on the number of corresponding sub-electromagnetic touch pulses required for the report, to implement one report, that is, the number of the sub-electromagnetic touch pulses in different sub-blanking time periods T1 may be different, and may change according to changes in the report of an electromagnetic touch function.

In an embodiment, with reference to FIGS. 1 to 4, 9, and 11, the display panel further includes the synchronization circuit 150 connected to the electromagnetic touch drive circuit 140 and the gate drive circuit 130 to provide a synchronization signal to the electromagnetic touch drive circuit 140 in response to the display signal DS from the gate drive circuit 130. The synchronization circuit 150 may be integrated into the source drive circuit 120 or the electromagnetic touch drive circuit 140, or may be independently provided from the source drive circuit 120 and the electromagnetic touch drive circuit 140. The synchronization circuit 150 is described to be independently provided from the source drive circuit 120 and the electromagnetic touch drive circuit 140 in an embodiment of the present disclosure, but the present disclosure is not limited thereto.

As shown in FIG. 4, the display signal DS has the same period as but opposite phases to the synchronization signal SS. That is, when the display signal DS is in the ON state, the synchronization signal SS is in the OFF state. When the display signal DS is in the OFF state, the synchronization signal SS is in the ON state. The electromagnetic touch drive circuit 140 transmits/receives the electromagnetic touch scanning signals M1, M2 . . . Mn to/from the electromagnetic touch electrode group MTE in response to the rising edge of the synchronization signal SS, and stops the transmitting/receiving of electromagnetic touch scanning signals M1, M2 . . . Mn in response to the falling edge of the synchronization signal SS. That is, during the duration when the synchronization signal is in the ON state (corresponding to the sub-blanking time period T1 and/or the blanking time period ft1 of the display signal, thereafter, this duration is referred to be the sub-blanking time period T1 and/or the blanking time period ft1), the touch drive circuit 140 provides/receives the electromagnetic touch scanning signals M1, M2 . . . Mn. During the duration when the synchronization signal is in the OFF state (corresponding to the sub-charging time period TO of the display signal), the source drive circuit 120 and the gate drive circuit 130 provide the display signal DS and the data signal to the sub-pixel 210. The present disclosure is not limited hereto, the electromagnetic touch drive circuit 140 may transmits/receives the electromagnetic touch scanning signals in response to the falling edge of the synchronization signal SS, and stops the transmitting/receiving in response to the rising edge of the synchronization signal SS. That is, the sub-blanking time period T1 and the blanking time period ft1 of the display signal may correspond to the OFF state of the synchronization signal.

Each synchronization signal includes a plurality of synchronization pulses pl2 (corresponding to a duration when the sync signal is in the ON state). Each synchronization pulse pl2 has rising edges and falling edges.

As shown in FIG. 10, the electromagnetic touch drive circuit 140 provides/receives electromagnetic touch scanning signals M1, M2 . . . Mn to/from the electromagnetic touch electrode group MTE in response to the synchronization signal SS and/or the frame synchronization signal FS. Although FIG. 10 shows that the electromagnetic touch electrode group MTE may include a first electromagnetic touch electrode group MTE1 extending along a first direction X and a second electromagnetic touch electrode group MTE2 extending along a second direction Y different from the first direction X, the present disclosure is not limited thereto.

The electromagnetic touch drive circuit provides the electromagnetic touch pulse during the sub-blanking time period (T1 or T1') close to the rising edges or falling edges of the synchronization pulse pl2 (i.e., a portion of the synchronization signal in the ON state).

Specifically, a pulse width of the synchronization pulse pl2 is smaller than a duration of the sub-blanking time period, facilitating standardization of the duration of the electromagnetic touch scanning signal during the sub-blanking time period (T1 or T1').

Specifically, when the display pulse pl1 is located at the rising edge or falling edge at the end of the sub-charging time period (T0 or T0'), the electromagnetic touch drive circuit is configured to provide the electromagnetic touch pulse during a corresponding sub-blanking time period (T1 or T1').

Furthermore, the electromagnetic touch drive circuit provides the electromagnetic touch pulse during the sub-blanking time period (T1 or T1') close to the rising edges of the synchronization pulse pl2.

Specifically, the synchronization pulse pl2 in the synchronization signal may be generated based on triggering of the rising or falling edges of the end time of the display pulse pl1 during the sub-charging time period, and based on triggering of the rising or falling edges of the start time of the next display pulse pl1. The electromagnetic touch scanning signal may be generated based on the rising or falling edges at the start time of the synchronization pulse pl2 in the synchronization signal, and is continuously to be transmitted to the falling or rising edges at the end time of the synchronization pulse pl2.

To completely separate the display signal and the electromagnetic touch scanning signal, total duration (T3 or T3') occupied by the plurality of sub-electromagnetic touch pulses transmitted during the sub-blanking time period (T1 or T1') may be set to be less than or equal to duration T4 of the corresponding synchronization pulse pl2, the duration T4 of the synchronization pulse pl2 is set to be less than or equal to the duration of the corresponding sub-blanking time period (T1 or T1'). Through the foregoing time division, use of the synchronization signal, and settings of the related duration, complete isolation of the display signal and the electromagnetic touch scanning signal may be achieved, greatly reducing signal interference. Noise data may be shown in FIG. 5. An ordinate represents a size of noise (in decibels), and a column A represents an interference (approximately −38 dB) received by the electromagnetic touch scanning signal obtained through a manner of "time division and use of the synchronization signal" mentioned in the present disclosure. A column B represents an interference (approximately −26 dB) received by the electromagnetic touch scanning signal obtained in a random manner. It may be known that the former is less.

In an embodiment, the display panel has a first working time period for transmitting/receiving a touch identification signal for roughly scanning and a second working time period for transmitting/receiving the electromagnetic touch scanning signal for finely scanning. The second working time period follows the first working time period. The frame period in the second working time period includes the first type of frame period. The electromagnetic touch drive circuit is configured to receive a touch identification signal from the electromagnetic touch electrode group during the first working time period. The touch identification signal includes a touch identification pulse generated based on the electromagnetic stylus acting on the display panel. In response to the ending time point of the touch identification pulse in the electromagnetic touch identification signal, the display panel is switched to the second working time period during which electromagnetic touch drive circuit is configured to transmit/receive the electromagnetic touch scanning signal from the electromagnetic touch electrode group.

Specifically, in the present embodiment, the premise that the frame period includes the first type of frame period discussed above is limited. Prior to this, it is necessary to set the display panel to be in the first working time period, to be specific, the electromagnetic touch electrode group receives the touch identification signal. It may be understood as in the first working time period, the electromagnetic touch drive circuit may transmit the touch identification signal to the electromagnetic touch electrode group to roughly scan the plurality of electromagnetic touch electrode groups. For example, the plurality of electromagnetic touch scanning signals corresponding to some electromagnetic touch electrode groups (which may be arranged at equal intervals) may be provided during a blanking time period of the frame, and a generation of the touch identification pulse may be determined based on the feedback of some electromagnetic touch electrode groups. For example, if the feedback of some electromagnetic touch electrode groups indicates that the electromagnetic stylus acts on the display panel, the touch identification pulse is generated, furthermore, the electromagnetic touch drive circuit is driven to provide the electromagnetic touch scanning signal during the sub-blanking time period for fine scanning.

It should be noted that the touch identification pulse may be considered to exist inside the electromagnetic touch drive circuit, and the touch identification pulse basically does not cause interference to the display signal.

In an embodiment, as shown in FIG. 6, the drive circuit 100 further includes a capacitive touch drive circuit 160. The capacitive touch drive circuit 160 is connected to the gate drive circuit to receive the display signal from the gate drive circuit. The frame period FT further includes a second type of frame period FT2 with a same period, phase, duty cycle, rising edge, and falling edge (e.g., sub-blanking time period and sub-charging time period) as the first type of frame period FT1. and configured to transmits/receives a capacitive touch signal to the active area AA during the second type of frame period in response to the display signal from the gate drive circuit.

When a finger or stylus approaches or touches the display panel, the capacitance at the touch position changes. By scanning a capacitive touch signal (or a capacitance value) corresponding to the capacitive touch electrode group 101 across all areas of the display panel by using the capacitive touch signal transmitted from the capacitive touch drive circuit 160, the capacitive touch drive circuit 160 may determine the area where the capacitance value changes as the touch position based on the capacitive touch signal transmitted from the capacitive touch electrode group 101.

The capacitive touch electrode group 101 includes a plurality of first capacitor metal traces 11 extending along the first direction X and a plurality of second capacitor metal traces 12 extending along the second direction Y. The plurality of first capacitor metal traces 11 are arranged side by side and spaced apart along the second direction Y, and at least one first capacitor metal trace 11 is electrically connected to the capacitive touch drive circuit 16. The plurality of second capacitor metal traces 12 are arranged side by side and spaced apart along the first direction Y. Each second capacitor metal trace 12 is electrically connected to the capacitive touch drive circuit. The first capacitor metal traces 11 and the second capacitor metal traces 12 are insulated from each other. Since the first capacitor metal traces 11 extend along the first direction and the second capacitor metal traces 12 extend along the second direction, a capacitor may be formed at the intersection of the first capacitor metal traces 11 and the second capacitor metal traces 12. When the finger or the stylus touches the capacitor at a certain position, the capacitance value of the capacitor may be changed to output the capacitive touch signal. It can be understood that the above description is described by taking the mutual capacitance capacitive touch circuit as an example. In fact, the capacitive touch circuit may include only a plurality of first capacitor metal traces 11 extending along the first direction, or the capacitive touch circuit may include only a plurality of first capacitor metal traces 11 extending along the second direction. In this case, the capacitive touch circuit is a self-capacitive capacitive touch circuit. In an embodiment of the present disclosure, the mutual capacitance capacitive touch circuit is described as an example.

The capacitive touch drive circuit 160 and the electromagnetic touch drive circuit 140 may be integrated into an integrated body or independently arranged from each other. For convenience, the timing circuit 110, the source drive circuit 120, the gate drive circuit 130 and the sub-pixel are omitted in FIG. 10, but the arrangement and their descriptions of the timing circuit 110, the source drive circuit 120, the gate drive circuit 130 and the sub-pixel may be applied to FIG. 10.

The capacitive touch drive circuit 160 transmits/receives the capacitive touch signal to/from the capacitive touch electrode group in response to the synchronization signal SS. The display signal DS and the synchronization signal SS have the same period but opposite phases. The capacitive touch drive circuit 160 transmits/receives the capacitive touch signal to/from the capacitive touch electrode group in response to the rising edge of the synchronization signal SS, and stops the transmitting and receiving of the capacitive touch signal to/from the capacitive touch electrode group in response to the falling edge of the synchronization signal SS. That is, during the duration when the synchronization signal is in the ON state (corresponding to the sub-blanking time period T1 and the blanking time period ft1 of the display signal), the capacitive touch drive circuit transmits/receives the capacitive touch signal.

The plurality of frame periods FT further include a second type of frame period FT2 with a same period, phase, duty cycle, rising edge, and falling edge as the first type of frame period FT1. The second type of frame period FT2 may be different from the first type of frame period FT1. The second type of frame period FT2 and the first type of frame period FT1 may be provided alternately, but the relationship of the first and second type of frame periods FT1 and FT2 is not limited hereto. In the second type of frame period FT2, the gate drive circuit is configured to provide the display pulse pl1 to the sub-pixels during the sub-charging time period T0, and the capacitive touch drive circuit is configured to provide a capacitive touch pulse (a portion of the capacitive touch signal) during the sub-blanking time period T1. It may be understood that the display panel may also be integrated with a capacitive touch function, and to avoid the impact of a capacitive touch signal on an electromagnetic touch scanning signal, the second type of frame period FT2 that is different from the first type of frame period FT1 may be selected. The sub-blanking time period T1 may be used to transmit the capacitive touch signal, while avoiding the impact on the display signal and electromagnetic touch scanning signal.

The present disclosure further provides an electronic terminal. The electronic terminal includes the display panel according to any one of the implementations.

The present disclosure further provides a driving method of a display panel, for driving the display panel according to any one of the embodiments. The driving method is implemented by: driving the electromagnetic touch drive circuit to provide the electromagnetic touch scanning signal during the sub-blanking time period in the first type of frame period. As discussed above, it may be understood that an originally continuous and complete electromagnetic touch scanning signal is split into a plurality of electromagnetic touch scanning signals, so that the electromagnetic touch drive signal is provided during the sub-blanking time period T1. This not only improves reliability of an electromagnetic touch function, but also helps to improve a report rate of the electromagnetic touch function. Specifically, the solutions may be implemented collaboratively by including but not limited to the synchronization signal discussed above.

In an embodiment, as shown in FIG. 7, the step of driving an electromagnetic touch drive circuit to provide an electromagnetic touch scanning signal during a sub-blanking time period in a first type of frame period is implemented by, but is not limited to, the following steps.

At Step S01, the electromagnetic touch drive circuit is controlled to receive a touch identification signal. The touch identification signal includes a touch identification pulse generated based on an electromagnetic stylus acting on the display panel.

Specifically, as discussed above, the obtaining of the touch identification signal is implemented by the following steps: roughly scan the plurality of electromagnetic touch electrode groups by the electromagnetic touch drive circuit, such as providing the plurality of electromagnetic touch scanning signals corresponding to some electromagnetic touch electrode groups (which may be arranged at equal intervals) during the frame blanking time period, and a generation of the touch identification pulse may be determined based on the feedback of some electromagnetic touch electrode groups. For example, if the feedback of some electromagnetic touch electrode groups indicates that the electromagnetic stylus acts on the display panel, the touch identification pulse is generated.

At Step S02, After the touch identification pulse in the touch identification signal, driving the electromagnetic touch drive circuit to provide the electromagnetic touch scanning signal during the sub-blanking time period in the first type of frame period.

It may be understood that the first type of frame period in the present embodiment is set after the generation of the touch identification pulse in the electromagnetic touch identification signal. In this case, it may be considered that the electromagnetic touch drive circuit provides the electromagnetic touch scanning signal for fine scanning during the sub-blanking time period T1. For example, the plurality of electromagnetic touch scanning signals may be sequentially provided through the plurality of sub-blanking time periods T1, to drive at least a plurality of continuously arranged electromagnetic touch electrode groups.

In an embodiment, as shown in FIG. 8, the driving method may further be implemented by the following steps.

At Step S1, a display signal is generated to control a display panel to display an image, and a synchronization signal is generated based on the display signal. The display signal is alternately divided into a sub-charging time period and a sub-blanking time period. The synchronization signal includes a synchronization pulse for the sub-blanking time period.

The display signal includes a display pulse during the sub-charging time period. Specifically, as discussed above, the synchronization signal used for driving a generation of an electromagnetic touch scanning signal may be generated based on the display signal.

At Step S2: an initial capacitive touch signal and an initial electromagnetic touch scanning signal are generated to control the display panel for first precision capacitive scanning and first precision electromagnetic scanning.

Step S2 may be understood as performing the first precision capacitive scanning and the first precision electromagnetic scanning at low first precision at the time of startup. For example, a portion of capacitive touch electrode groups and electromagnetic touch electrode groups scattered from one edge to the other edge in the entire panel may be selected for scanning.

At Step S3, a touch identification signal generated based on the initial electromagnetic touch scanning signal is obtained, and it is determined whether an electromagnetic stylus acts on the display panel based on whether the touch identification signal includes a touch identification pulse generated based on the electromagnetic stylus acting on the display panel.

For details, refer to the relevant descriptions above.

In response to determine that the electromagnetic stylus acts on the display panel, Step 4 is performed.

At Step S4, At the beginning of the synchronization pulse in the synchronization signal, the initial capacitive touch signal and the initial electromagnetic touch scanning signal are turned off, and the electromagnetic touch scanning signal is generated. The electromagnetic touch scanning signal includes an electromagnetic touch scanning signal during the sub-blanking time period.

As discussed above, before determining that the electromagnetic stylus acts on the display panel, a rough scan of capacitive touch and electromagnetic touch may be performed on the display panel. After determining that the electromagnetic stylus acts on the display panel, the electromagnetic touch scanning signal may be generated as discussed above to finely scan the electromagnetic touch. For example, each electromagnetic touch electrode group may be scanned.

Furthermore, an area of the display panel which the electromagnetic stylus contacts may be obtained in Step S3, and in Step S4, the electromagnetic touch drive circuit generates electromagnetic touch scanning signals acting on a plurality of electromagnetic touch electrode groups in the area during the sub-blanking time period T1 in the first type of frame period.

It may be understood that the area of the display panel which the electromagnetic stylus contacts may be determined based on a position of a sub-electromagnetic touch pulse with a specific change in the electromagnetic touch scanning signal. Based on the contact of the electromagnetic stylus with the display panel, at least one electromagnetic touch scan may be controlled to be concentrated in the area for accurate identification and corresponding feedback, achieving functions including but not limited to writing.

The present disclosure provides a display panel and a driving method therefor, and an electronic terminal. The display panel includes a drive circuit. The drive circuit includes a timing circuit, a gate drive circuit, and an electromagnetic touch drive circuit. The timing circuit is configured to provide a frame synchronization signal FS to the gate drive circuit and the electromagnetic touch drive circuit. The frame synchronization signal has a frame period, and the frame period includes a plurality of sub-periods. Each sub-period includes a sub-charging time period and a sub-blanking time period. The frame period includes a first type of frame period. In the first type of frame period, the gate drive circuit is configured to provide a display pulse during the sub-charging time period. The electromagnetic touch drive circuit is configured to provide an electromagnetic touch scanning signal during the sub-blanking time period. It may be understood that an originally continuous and complete electromagnetic touch scanning signal is split into a plurality of electromagnetic touch scanning signals, so that the electromagnetic touch drive circuit is generated during the sub-blanking time period, thereby improving reliability and a report rate of an electromagnetic touch function.

The foregoing introduces a display panel and driving method therefor, and a structure of an electronic terminal provided by an embodiment of the present disclosure in detail. Although specific examples are used to describe the principles and implementations of the present disclosure in detail, the foregoing embodiments are merely intended to help understand the technical solutions and core ideas of the present disclosure, a person of ordinary skill in the art should understand that they may still make modifications to the technical solutions described in the foregoing embodiments or make equivalent replacements to some technical features therefor, without departing from the spirit and scope of the technical solutions of the embodiments of the present disclosure.

What is claimed is:

1. A display panel, comprising an active area and a non-active area where a drive circuit is located, wherein the drive circuit comprises:

a timing circuit configured to provide a frame synchronization signal;

a gate drive circuit connected to the timing circuit and configured to provide a display signal in response to the frame synchronization signal, wherein the display signal has a first type of frame period of a same duration as that of a frame period of the frame synchronization signal, the first type of frame period of the display signal comprises a plurality of sub-periods, and each of the plurality of sub-periods comprises a sub-charging time period and a sub-blanking time period; and an electromagnetic touch drive circuit connected to the gate drive circuit and configured to transmit/receive an electromagnetic touch scanning signal to the active area for touch control during the sub-blanking time period in response to the display signal from the gate drive circuit, wherein the electromagnetic touch scanning signal is a pulse signal, and the electromagnetic touch scanning signal comprises a plurality of sub-electromagnetic touch pulses, wherein the gate drive circuit is configured to provide the display signal to the active area for display during the sub-charging time period in response to the frame synchronization signal.

2. The display panel of claim 1, wherein in each sub-period of the first type of frame period, the electromagnetic touch drive circuit is configured to provide the electromagnetic touch scanning signal during the sub-blanking time period.

3. The display panel of claim 2, wherein the display panel further comprises a plurality of electromagnetic touch electrode groups in the active area, the electromagnetic touch drive circuit is electrically connected to the plurality of electromagnetic touch electrode groups, and in the first type of frame period, a duration of the sub-blanking time period is equal to or greater than a duration for the plurality of electromagnetic touch electrode groups to transmit a report once to the electromagnetic touch drive circuit; and wherein the electromagnetic touch drive circuit provides at least two of the sub-electromagnetic touch pulses during the sub-blanking time period, so that at least two of the electromagnetic touch electrode groups correspond to the at least two of the sub-electromagnetic touch pulses transmit the report once.

4. The display panel of claim 3, wherein in the first type of frame period, the electromagnetic touch drive circuit provides at least three corresponding sub-electromagnetic touch pulses during the corresponding sub-blanking time period, so that at least three electromagnetic touch electrode groups transmit the report once.

5. The display panel of claim 3, wherein a pulse width of at least one of the plurality of sub-electromagnetic touch pulses corresponding to at least one of the electromagnetic touch electrode groups close to an edge of the display panel is greater than a pulse width of at least one of the plurality of sub-electromagnetic touch pulses corresponding to at least one of the electromagnetic touch electrode groups at a center of the display panel.

6. The display panel of claim 2, wherein the first type of frame period includes a first type of sub-frame period and a second type of sub-frame period, and wherein a number of the sub-electromagnetic touch pulses of the electromagnetic touch scanning signal during the sub-blanking time period in the first type of sub-frame period is different from a number of the sub-electromagnetic touch pulses of the electromagnetic touch scanning signal during the sub-blanking time period in the second type of sub-frame period.

7. The display panel of claim 1, wherein the display panel further comprises a synchronization circuit connected to the electromagnetic touch drive circuit and the gate drive circuit to provide a synchronization signal to the electromagnetic touch drive circuit in response to the display signal from the gate drive circuit, the synchronization signal comprises a plurality of synchronization pulses, and each of the synchronization pulses has a rising edge and a falling edge; and the electromagnetic touch drive circuit provides the electromagnetic touch pulse during the sub-blanking time period in response to the rising edge and/or falling edge of the synchronization pulse.

8. The display panel of claim 7, wherein the electromagnetic touch drive circuit provides the electromagnetic touch pulse during the sub-blanking time period in response to the rising edge of the synchronization pulse; and a pulse width of the synchronization signal is less than or equal to a duration of the sub-blanking time period.

9. The display panel of claim 1, wherein the display panel has a first working time period and a second working time period following the first working time period, the frame period of the display signal in the second working time period includes the first type of frame period, and the electromagnetic touch drive circuit is configured to provide a touch identification signal to the active area during the first working time period to roughly scan the plurality of electromagnetic touch electrode groups, wherein the touch identification signal comprises a touch identification pulse, and an electromagnetic signal of an electromagnetic stylus is scanned during a time period of the touch identification pulse; and wherein the display panel is switched to the second working time period after the touch identification pulse in the electromagnetic touch identification signal is identified.

10. The display panel of claim 1, wherein the drive circuit further comprises a capacitive touch drive circuit connected to the gate drive circuit to receive the display signal from the gate drive circuit, and the display signal further includes a second type of frame period with a same sub-blanking time period and sub-charging time period as the first type of frame period, and the gate drive circuit is configured to provide the display signal to the active area for display during the sub-charging time period in the second type of frame period, and the capacitive touch drive circuit is configured to provide at least one capacitive touch pulse in response to the display signal from the gate drive circuit during the sub-blanking time period in the second type of frame period.

11. The display panel of claim 1, wherein the drive circuit further comprises a pixel drive circuit, the pixel drive circuit comprises a pixel drive transistor, and a material of the pixel drive transistor comprises low-temperature polysilicon.

12. A driving method of a display panel, for driving the display panel of claim 1, wherein the driving method comprises:

driving the electromagnetic touch drive circuit to provide the electromagnetic touch scanning signal during the sub-blanking time period in the first type of frame period.

13. The driving method of a display panel of claim 12, wherein the step of driving the electromagnetic touch drive circuit to provide the electromagnetic touch scanning signal during the sub-blanking time period in the first type of frame period comprises:

controlling the electromagnetic touch drive circuit to receive a touch identification signal, wherein the touch identification signal comprises a touch identification pulse generated based on an electromagnetic stylus acting on the display panel; and after the touch identification pulse in the touch identification signal, driving the electromagnetic touch drive circuit to provide the electromagnetic touch scanning signal during the sub-blanking time period in the first type of frame period.

14. An electronic terminal, wherein the electronic terminal comprises a display panel, wherein the display panel comprises an active area and a non-active area where a drive circuit is located, and the drive circuit comprises:

a timing circuit configured to provide a frame synchronization signal;

a gate drive circuit connected to the timing circuit and configured to provide a display signal in response to the frame synchronization signal, wherein the display signal has a first type of frame period of a same duration as that of a frame period of the frame synchronization signal, the first type of frame period of the display signal comprises a plurality of sub-periods, and each of the plurality of sub-periods comprises a sub-charging time period and a sub-blanking time period; and an electromagnetic touch drive circuit connected to the gate drive circuit and configured to transmit/receive an electromagnetic touch scanning signal to the active area for touch control during the sub-blanking time period in response to the display signal from the gate drive circuit, wherein the electromagnetic touch scanning signal is a pulse signal, and the electromagnetic touch scanning signal comprises a plurality of sub-electromagnetic touch pulses, wherein the gate drive circuit is configured to provide the display signal to the active area for display during the sub-charging time period in response to the frame synchronization signal.

15. The electronic terminal of claim 14, wherein in each sub-period of the first type of frame period, the electromagnetic touch drive circuit is configured to provide the electromagnetic touch scanning signal during the sub-blanking time period.

16. The electronic terminal of claim 15, wherein the display panel further comprises a plurality of electromagnetic touch electrode groups in the active area, the electromagnetic touch drive circuit is electrically connected to the plurality of electromagnetic touch electrode groups, and in the first type of frame period, a duration of the sub-blanking time period is equal to or greater than a duration for the plurality of electromagnetic touch electrode groups to trans-mit a report once to the electromagnetic touch drive circuit; and wherein the electromagnetic touch drive circuit provides at least two of the sub-electromagnetic touch pulses during the sub-blanking time period, so that at least two of the electromagnetic touch electrode groups corre-spond to the at least two of the sub-electromagnetic touch pulses transmit the report once.

17. The electronic terminal of claim 16, wherein in the first type of frame period, the electromagnetic touch drive circuit provides at least three sub-electromagnetic touch pulses during the corresponding sub-blanking time period, so that at least three electromagnetic touch electrode groups transmit the report once.

18. The electronic terminal of claim 16, wherein a pulse width of at least one of the plurality of sub-electromagnetic touch pulses corresponding to at least one of the electromagnetic touch electrode groups close to an edge of the display panel is greater than a pulse width of at least one of the plurality of sub-electromagnetic touch pulses corresponding to at least one of the electromagnetic touch electrode groups at a center of the display panel.

19. The electronic terminal of claim 15, wherein the first type of frame period includes a first type of sub-frame period and a second type of sub-frame period, and wherein a number of the sub-electromagnetic touch pulses of the electromagnetic touch scanning signal during the sub-blanking time period in the first type of sub-frame period is different from a number of the sub-electro-magnetic touch pulses of the electromagnetic touch scanning signal during the sub-blanking time period in the second type of sub-frame period.

20. The electronic terminal of claim 14, wherein the display panel further comprises a synchronization circuit connected to the electromagnetic touch drive circuit and the gate drive circuit to provide a synchronization signal to the electromagnetic touch drive circuit in response to the display signal from the gate drive circuit, the synchronization signal comprises a plurality of synchronization pulses, and each of the synchronization pulses has a rising edge and a falling edge; and the electromagnetic touch drive circuit provides the elec-tromagnetic touch pulse during the sub-blanking time period in response to the rising edge and/or falling edge of the synchronization pulse.

* * * * *